US012560225B2

(12) United States Patent (10) Patent No.: US 12,560,225 B2
Daniel et al. (45) Date of Patent: Feb. 24, 2026

(54) MOTORIZED SYSTEM

(71) Applicant: Schaeffler Technologies AG & Co. KG, Herzogenaurach (DE)

(72) Inventors: Patrick Daniel, Kirkel (DE); Dietmar Rudy, Kleinbundenbach (DE); Carl White, Rock Hill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/444,987

(22) Filed: Feb. 19, 2024

(65) Prior Publication Data

US 2025/0084915 A1     Mar. 13, 2025

Related U.S. Application Data

(60) Provisional application No. 63/537,105, filed on Sep. 7, 2023.

(51) Int. Cl.
F16H 25/20          (2006.01)
H02K 7/116          (2006.01)
(52) U.S. Cl.
CPC ......... F16H 25/2015 (2013.01); H02K 7/116 (2013.01); F16H 2025/2075 (2013.01)
(58) Field of Classification Search
CPC ..................... F16H 2025/2075; F16H 25/2015
See application file for complete search history.

(56) References Cited

U.S. PATENT DOCUMENTS

| | | | | |
|---|---|---|---|---|
| 2,854,113 A | * | 9/1958 | Hallden | .............. F16H 25/2015 |
| | | | | 74/89.37 |
| 4,428,710 A | * | 1/1984 | Grisebach | .............. B25J 15/022 |
| | | | | 901/29 |
| 10,563,742 B2 | | 2/2020 | Daniel et al. | |
| 11,754,157 B2 | * | 9/2023 | Keranen | ............. F16H 25/2252 |
| | | | | 74/89.39 |
| 2008/0048514 A1 | | 2/2008 | Hoffmann et al. | |
| 2017/0089408 A1 | | 3/2017 | Berthelemy | |
| 2018/0031092 A1 | | 2/2018 | Daniel et al. | |

FOREIGN PATENT DOCUMENTS

| | | |
|---|---|---|
| DE | 102008013626 A1 | 9/2008 |
| DE | 202008009490 U1 | 10/2008 |
| DE | 102015204066 A1 | 9/2016 |

(Continued)

*Primary Examiner* — Gregory Robert Weber

(74) *Attorney, Agent, or Firm* — Price Heneveld LLP

(57) ABSTRACT

A motorized system includes a motor that drives rotation of an input shaft, a first gear system coupled with the input shaft, a spindle drive, and a measuring arrangement. The spindle drive has a driving element that is coupled with the first gear system, such that rotation of the input shaft prompts rotation of the driving element via the first gear system, and a driven element that is engaged with the driving element, such that rotation of the driving element drives axial movement of the driven element. The measuring arrangement includes a second gear system coupled with the input shaft, an indicator coupled with the second gear system, such that rotation of the input shaft prompts rotation of the indicator via the second gear system, and at least one limit switch with which the indicator interacts to control operation of the motor.

10 Claims, 4 Drawing Sheets

(56) References Cited

FOREIGN PATENT DOCUMENTS

| | | | |
|----|----------------|------|---------|
| DE | 102015204068   | A1   | 9/2016  |
| DE | 102015204069   | A1   | 9/2016  |
| DE | 102015204073   | B4   | 7/2017  |
| DE | 102021111644   | A1   | 11/2022 |
| EP | 2056430        | B1   | 9/2017  |
| SU | 163937         | A1 * | 3/1991  |
| WO | 2014058051     | A1   | 4/2014  |
| WO | 2017180850     | A1   | 10/2017 |

* cited by examiner

MOTORIZED SYSTEM

CROSS-REFERENCE TO RELATED APPLICATIONS

This application claims the benefit of priority under 35 U.S.C. § 119 of U.S. Provisional Application No. 63/537, 105, filed on Sep. 7, 2023, the entire contents of which are incorporated herein by reference.

FIELD OF THE DISCLOSURE

The present disclosure generally relates to a motorized system. More particularly, the present disclosure relates to a motorized system that includes a first gear system that is coupled with a spindle drive and a second gear system that is operably coupled with an indicator for interaction with at least one limit switch.

BACKGROUND OF THE DISCLOSURE

Motors can be used to power operation of spindle drives. Limit switches often control or measure operation of motorized systems.

SUMMARY OF THE DISCLOSURE

According to a first aspect of the present disclosure, a motorized system includes a motor that drives rotation of an input shaft, a first gear system operably coupled with the input shaft, a spindle drive, and a measuring arrangement. The spindle drive has a driving element that is operably coupled with the first gear system, such that rotation of the input shaft is operable to prompt rotation of the driving element via the first gear system, and a driven element that is engaged with the driving element, such that rotation of the driving element drives axial movement of the driven element. The measuring arrangement includes a second gear system operably coupled with the input shaft, an indicator operably coupled with the second gear system, such that rotation of the input shaft is operable to prompt rotation of the indicator via the second gear system, and at least one limit switch with which the indicator interacts to control operation of the motor.

Embodiments of the first aspect of the disclosure can include any one or a combination of the following features:

the at least one limit switch comprises a single limit switch that is triggered by the indicator in an extended condition of the spindle drive and triggered by the indicator in a retracted condition of the spindle drive;

the at least one limit switch comprises a first limit switch that is triggered by the indicator in an extended condition of the spindle drive and a second limit switch that is triggered by the indicator in a retracted condition of the spindle drive;

the indicator and the input shaft are configured to rotate about a common axis of rotation;

the first and second gear systems are operably coupled with the input shaft on opposite axial ends of the motor;

the first gear system comprises a reduction gear;

the second gear system comprises a reduction gear;

the reduction ratio of the second gear system is higher than the reduction ratio of the first gear system;

the second gear system comprises a reduction gear, and the reduction gear has a reduction ratio such that rotating the input shaft to effect a full stroke of the spindle drive from a retracted condition to an extended condition causes the indicator to rotate less than 360 degrees;

the indicator is a first indicator and the measuring arrangement further comprises a second indicator configured to interact with the at least one limit switch; and the angular position of at least one of the first and second indicators is adjustable to allow for modification of the interaction between the at least one limit switch and the first and second indicators.

According to a second aspect of the present disclosure, a motorized system includes a motor that drives rotation of an input shaft, a first gear system operably coupled with the input shaft on a first axial end of the motor, and a measuring arrangement. The measuring arrangement includes a second gear system operably coupled with the input shaft on a second axial end of the motor opposite the first axial end, an indicator operably coupled with the second gear system, such that rotation of the input shaft is operable to prompt rotation of the indicator via the second gear system, and at least one limit switch with which the indicator interacts to control operation of the motor.

Embodiments of the second aspect of the disclosure can include any one or a combination of the following features:

a spindle drive having a driving element that is operably coupled with the first gear system, such that rotation of the input shaft is operable to prompt rotation of the driving element via the first gear system, and a driven element that is engaged with the driving element, such that rotation of the of the driving element drives axial movement of the driven element;

the driven element is a nut of the spindle drive, and the driving element is a threaded spindle operably coupled with the nut;

the gear ratio of the second gear system is higher than the gear ratio of the first gear system;

the indicator and the input shaft are configured to rotate about a common axis of rotation;

the indicator is a first indicator, and the measuring arrangement further comprises a second indicator configured to interact with the at least one limit switch; and the angular position of at least one of the first and second indicators is adjustable to allow for modification of the interaction between the at least one limit switch and the first and second indicators.

According to a third aspect of the present disclosure, a motorized system includes a motor that drives rotation of an input shaft, a first gear system operably coupled with the input shaft on a first axial end of the motor, a spindle drive, and a measuring arrangement. The spindle drive has a driving element that is operably coupled with the first gear system, such that rotation of the input shaft is operable to prompt rotation of the driving element via the first gear system, and a driven element that is engaged with the driving element, such that rotation of the driving element drives axial movement of the driven element. The measuring arrangement includes a second gear system operably coupled with the input shaft on a second axial end of the motor that is opposite the first axial end, an indicator operably coupled with the second gear system, such that rotation of the input shaft is operable to prompt rotation of the indicator via the second gear system, and at least one limit switch with which the indicator interacts to control operation of the motor.

Embodiments of the third aspect of the disclosure can further include the following feature: the gear ratio of the first gear system relative to the gear ratio of the second gear system is such that rotation of the input shaft that results in a full stroke movement of the driven element of the spindle drive results in less than 360 degrees of rotation of the indicator.

These and other features, advantages, and objects of the present disclosure will be further understood and appreciated by those skilled in the art by reference to the following specification, claims, and appended drawings.

Figure 1:
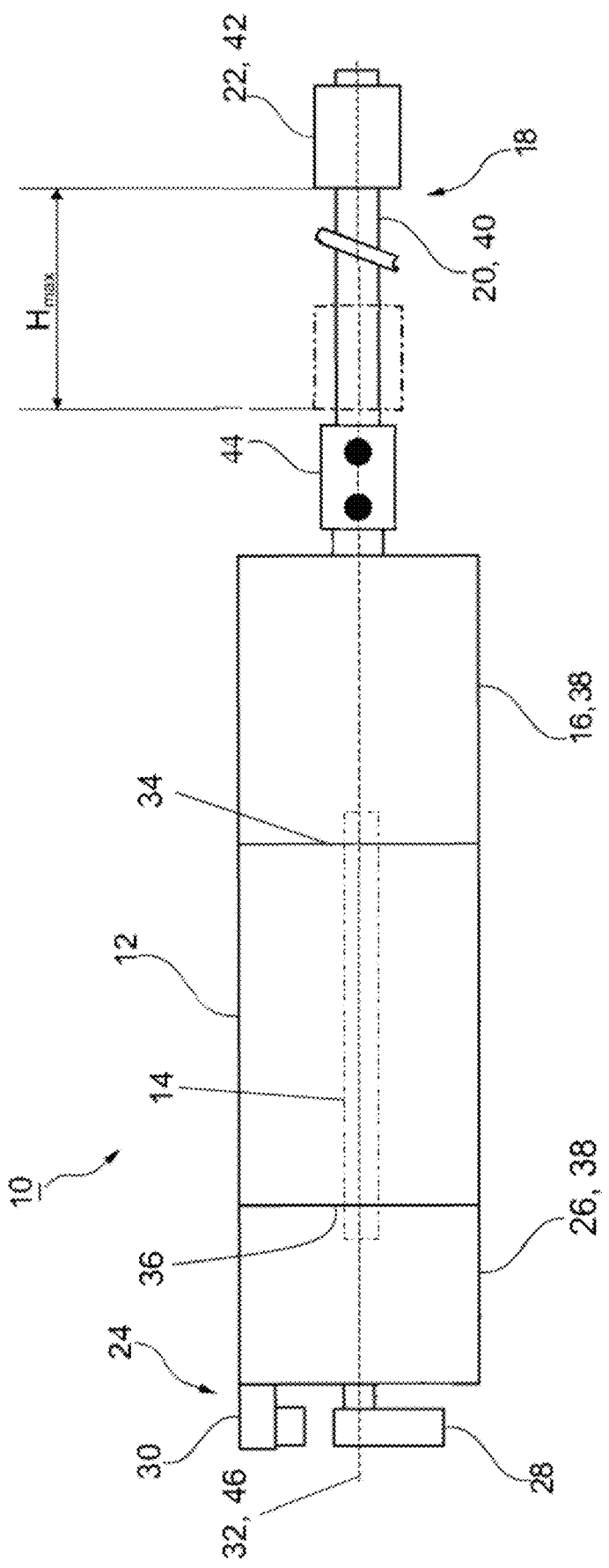
FIG. 1 is a front elevational view of a motorized system, illustrating a motor, a first gear system that is operably coupled with a spindle drive, a second gear system that is operably coupled with an indicator, and a limit switch, according to one embodiment.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a shaft configured to rotate in operation of the apparatus described herein. Further, the term "radial" and derivatives thereof, such as "radially," shall be understood in relation to the axis of the aforementioned shaft. For example, "radially outboard" refers to further away from the axis, while "radially inboard" refers to nearer to the axis. The term "circumferential" and derivatives thereof, such as "circumferentially," shall be understood in relation to the axis of the aforementioned shaft.

Referring now to FIGS. 1-4, a motorized system 10 includes a motor 12. The motor 12 drives rotation of an input shaft 14. A first gear system 16 is operably coupled with the input shaft 14. A spindle drive 18 includes a driving element 20 and a driven element 22. The driving element 20 is operably coupled with the first gear system 16 such that rotation of the input shaft 14 is operable to prompt rotation of the driving element 20 via the first gear system 16. The driven element 22 is engaged with the driving element 20 such that rotation of the driving element 20 drives axial movement of the driven element 22. The motorized system 10 includes a measuring arrangement 24. The measuring arrangement 24 includes a second gear system 26 that is operably coupled with the input shaft 14, an indicator 28 that is operably coupled with the second gear system 26, and at least one limit switch 30. The indicator 28 is operably coupled with the second gear system 26 such that rotation of the input shaft 14 is operable to prompt rotation of the indicator 28 via the second gear system 26. The indicator 28 interacts with the at least one limit switch 30 to control operation of the motor 12 of the motorized system 10.

Referring now to FIG. 1, the motorized system 10 includes the motor 12. In various implementations, the motor 12 is an electric motor. A variety of types of motors 12 are contemplated. The motor 12 is configured to drive rotation of the input shaft 14 about an axis 32. In some implementations, the input shaft 14 is a single unitary body, such as a metal shaft. It is contemplated that the input shaft 14 may include a plurality of components that are configured to rotate in unison about the axis 32 at a common rate of rotation. The motor 12 may include a first axial end 34 and a second axial end 36 opposite the first axial end 34. The input shaft 14 may be configured to be operably coupled with gear systems positioned at both the first and second axial ends 34, 36 of the motor 12, as described further herein.

Referring still to FIG. 1, the motorized system 10 includes the first gear system 16. In the embodiment illustrated in FIG. 1, the first gear system 16 is positioned at the first axial end 34 of the motor 12 and is operably coupled with the input shaft 14. The first gear system 16 may be a variety of types of gear systems that are operable to receive a rotary input and rotary output (e.g., planetary gear system, spur gear system, shaft gear system, etc.). In various embodiments, the first gear system 16 comprises a reduction gear 38. As such, the rotary output of the gear system rotates at a slower rate of rotation than the input shaft 14 that is operably coupled with the first gear system 16. A variety of types of gear systems are contemplated.

Referring now to FIG. 1, the motorized system 12 includes the spindle drive 18. The spindle drive 18 includes the driving element 20 and the driven element 22. The driving element 20 is operably coupled with the first gear system 16, such that rotation of the input shaft 14 is operable to drive the first gear system 16 which drives rotation of the driving element 20. The driven element 22 is engaged with the driving element 20, such that rotation of the driving element 20 drives axial movement of the driven element 22. In the exemplary embodiment illustrated in FIG. 1, the spindle drive 18 includes a threaded spindle 40 and a corresponding threaded nut 42. The spindle 40 serves as the driving element 20 and the nut 42 serves as the driven element 22 in the embodiment of the motorized system 10 illustrated in FIG. 1. It is contemplated that the nut 42 may be the driving element 20 and the spindle 40 may be the driven element 22, in some implementations. In the embodiment illustrated in FIG. 1, rotation of the driving element 20 drives linear movement of the driven element 22 between the retracted condition (shown in phantom in FIG. 1) and the extended condition as illustrated in FIG. 1. A full stroke of the spindle drive 18 (i.e., the linear travel path of the driven element 22 from the retracted condition to the extended condition) is illustrated as $H_{max}$ in FIG. 1. As further illustrated in FIG. 1, the motorized system 10 can include a clutch 44, such as a slip clutch or compensating clutch that is operably coupled with the first gear system 16 and the spindle drive 18.

Referring now to FIGS. 1-4, the motorized system 10 includes the measuring arrangement 24. The measuring arrangement 24 includes the second gear system 26. The second gear system 26 is operably coupled with the input shaft 14 such that rotation of the input shaft 14 by the motor 12 drives operation of the second gear system 26. In the embodiment illustrated in FIG. 1, the second gear system 26 is operably coupled with the input shaft 14 on the second axial end 36 of the motor 12 opposite the first axial end 34. As such, the first gear system 16 and the second gear system 26 are operably coupled with the input shaft 14 on opposite axial ends 34, 36 of the motor 12 of the motorized system 10. The first gear system 16 may include a reduction gear 38, such that the rate of rotation that is output from the second gear system 26 is less than the rate of rotation that is input into the second gear system 26 via the input shaft 14. A variety of types of gear systems are contemplated (e.g., planetary, spur, etc.). In some implementations, wherein the first gear system 16 and the second gear system 26 each includes a reduction gear 38, the gear ratio or reduction ratio of the second gear system 26 is higher than the reduction ratio of the first gear system 16. In some embodiment, the reduction gear 38 of the second gear system 26 has a reduction ratio such that rotating the input shaft 14 to effect a full stroke of the spindle drive 18 from the retracted condition to the extended condition causes less than 360 degrees of rotation of the output (e.g., the indicator 28, as described further herein) of the second gear system 26.

Figure 2:
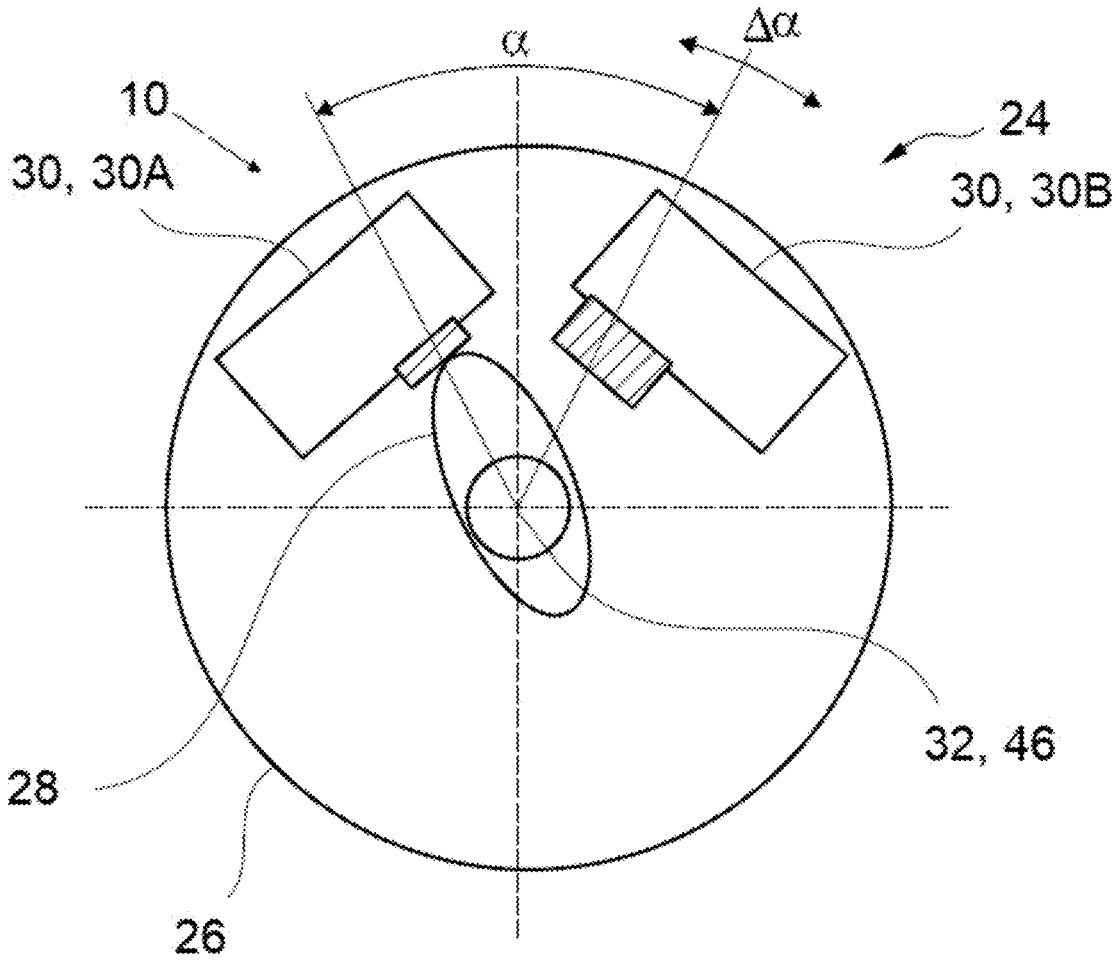
FIG. 2 is a side elevational view of a motorized system, illustrating a measuring arrangement that includes first and second limit switches and an indicator that is configured to interact with the first and second limit switches, according to one embodiment.
Figure 3:
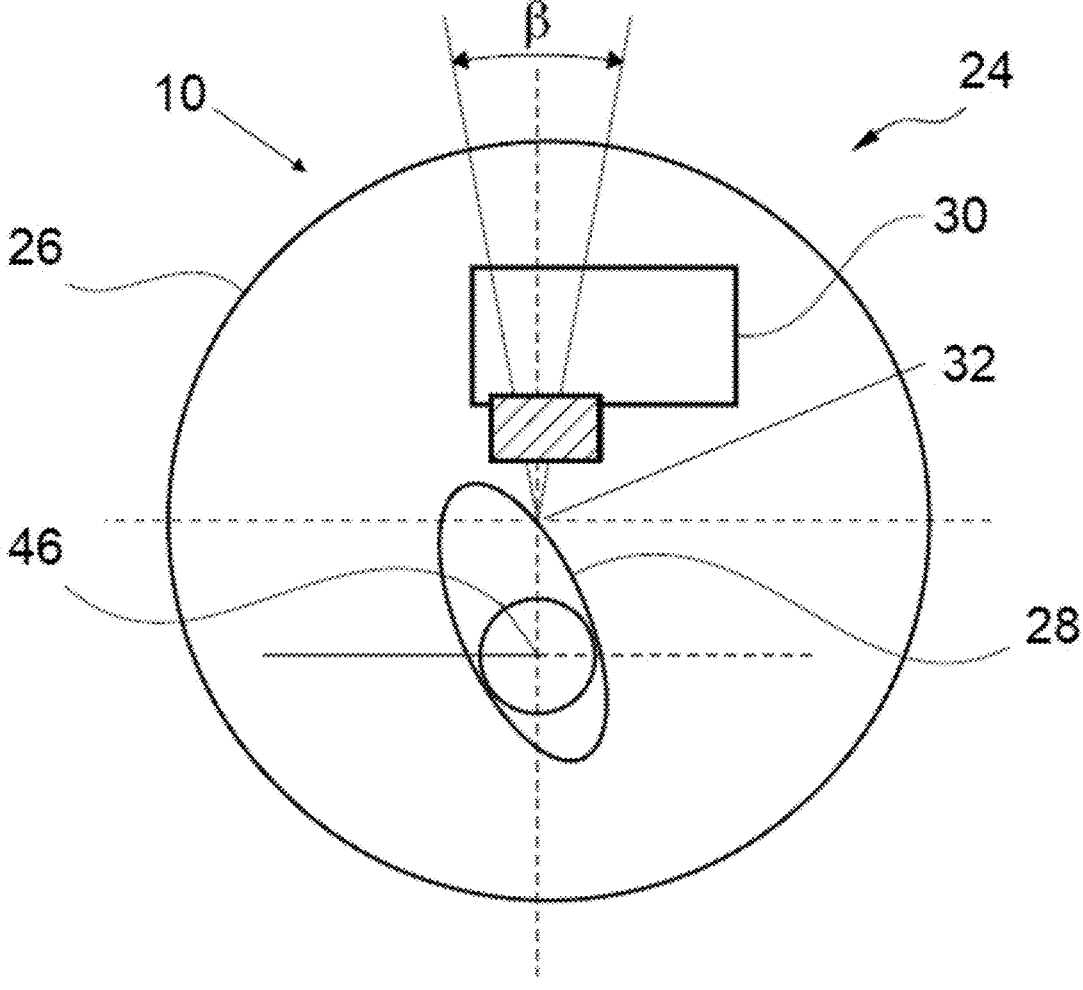
FIG. 3 is a side elevational view of a motorized system, illustrating a measuring arrangement that includes a limit switch and an indicator that is configured to interact with the limit switch, according to one embodiment.
Figure 4:
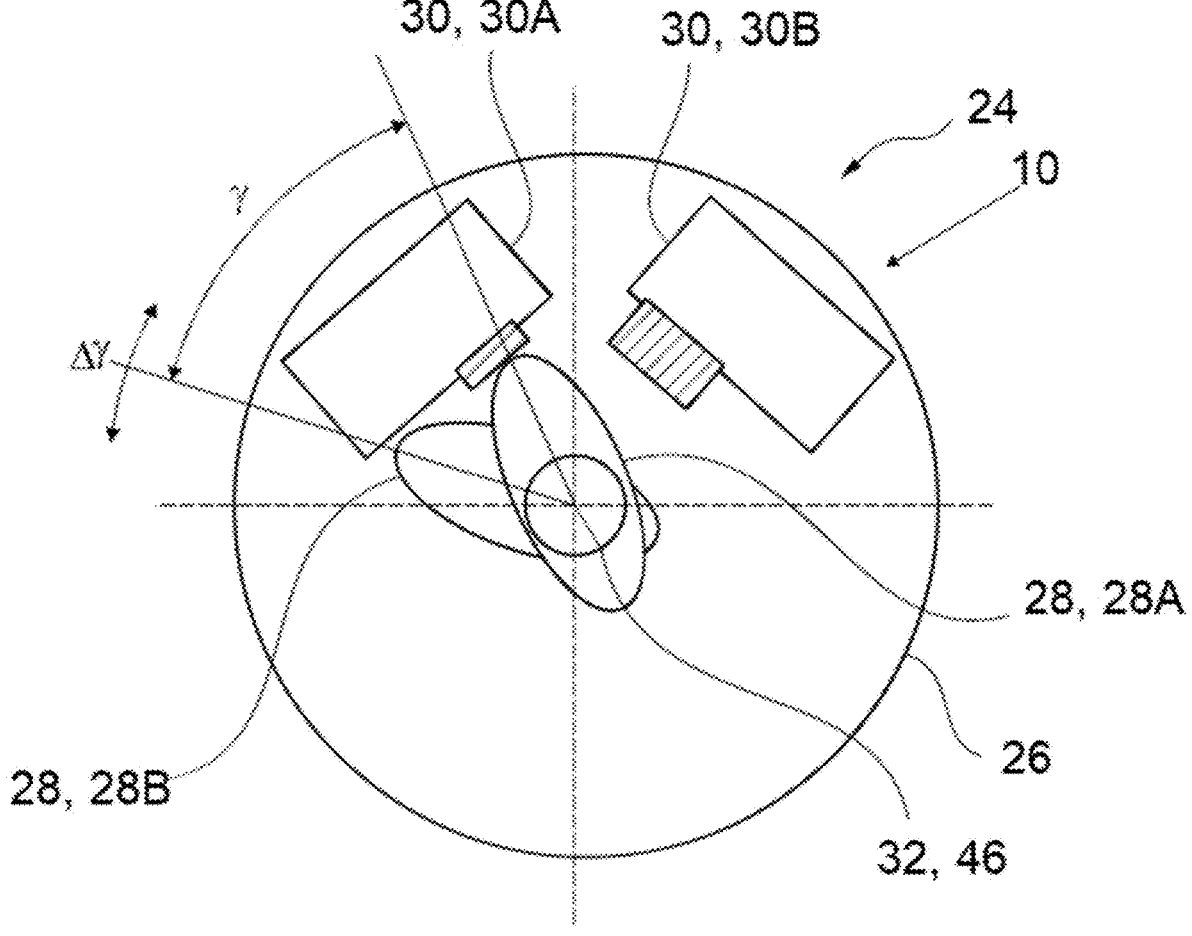
FIG. 4 is a side elevational view of a motorized system, illustrating a measuring arrangement that includes first and second indicators that are configured to interact with a limit switch, according to one embodiment.

Referring still to FIGS. 1-4, the measuring arrangement 24 includes at least one limit switch 30 and at least one indicator 28 that interacts with the at least one limit switch 30 to control operation of the motor 12 and/or measure the position of the driven element 22 of the spindle drive 18. In various implementations, the at least one indicator 28 may be a plurality of indicators 28, as illustrated exemplarily in FIG. 4. Further, in some embodiments, the at least one limit switch 30 may include a plurality of limit switches 30, as illustrated exemplarily in FIGS. 2 and 4. The indicator 28 is operably coupled with the second gear system 26, such that rotation of the input shaft 14 by the motor 12 drives rotation of the indicator 28 via the second gear system 26. The at least one indicator 28 may be at least one of a variety of types of indicators 28, such as a pointer, as illustrated in FIGS. 2-4. The at least one limit switch 30 may be at least one of a variety of types of limit switches 30, such as a mechanical switch or a reed switch.

In some implementations, an axis of rotation 46 about which the indicator 28 rotates is coaxial with the axis of rotation 32 about which the input shaft 14 rotates during operation of the motorized system 10. As such, the indicator 28 and the input shaft 14 may have a common axis of rotation. In some implementations, the axis of rotation 32 about which the input shaft 14 rotates is radially offset from the axis of rotation 46 about which the indicator 28 rotates, as illustrated in FIG. 3.

Referring now to FIGS. 2-4, the at least one limit switch 30 of the measuring arrangement 24 may be adjusted. In various implementations, the at least one limit switch 30 may be adjusted circumferentially relative to the axis of rotation 46 about which the indicator 28 is configured to rotate. As such, the amount of rotation that is necessary for the at least one indicator 28 to travel from an initial position to a subsequent position, wherein the at least one limit switch 30 is triggered, may be adjusted. This adjustment of rotational distance required of the indicator 28 to trigger the at least one limit switch 30 may, in turn, adjust the linear distance that the driven element 22 of the spindle drive 18 travels in a full stroke of the spindle drive 18 as determined by the measuring arrangement 24.

In an exemplary embodiment of the motorized system 10 illustrated in FIG. 2, the measuring arrangement 24 includes a single indicator 28 that is operable to rotate about a common axis of rotation 46 with the input shaft 14 that is operably coupled with the indicator 28 via the second gear system 26. The measuring arrangement 24 further includes a first limit switch 30A and a second limit switch 30B. The first and second limit switches 30A, 30B are circumferentially offset from each other in relation to the axis of rotation 46 about which the indicator 28 rotates. As illustrated in FIG. 2, the angle between circumferential positions of the indicator 28 wherein the indicator 28 triggers the first and second limit switches 30A, 30B, respectively, is represented by α. As such, in operation of the exemplary embodiment of the motorized system 10 illustrated in FIG. 2, the indicator 28 rotates 360 degrees minus angle α from a first position, wherein the indicator 28 is triggering the first switch 30A, to a second position, wherein the indicator 28 is triggering the second limit switch 30B, as a full stroke movement of the spindle drive 18 occurs. In various embodiments, the circumferential distance that the indicator 28 travels from the first limit switch 30A to the second limit switch 30B determines the linear distance that the driven element 22 of the spindle drive 18 moves in a full stroke of the spindle drive 18. In the exemplary embodiment illustrated in FIG. 2, the second limit switch 30B is operable to be adjusted circumferentially as represented by Δα in FIG. 2. The adjustability of the second limit switch 30B in the circumferential direction relative to the first limit switch 30A allows for adjustment of the corresponding linear distance that the driven element 22 of the spindle drive 18 moves in a full stroke of the spindle drive 18. Accordingly, the full stroke of the spindle drive 18 may be adjusted to suit various needs for different applications of the motorized system 10 via adjustment of the position of the second limit switch 30B.

In the exemplary embodiment of the measuring arrangement 24 illustrated in FIG. 3, the measuring arrangement 24 includes a single indicator 28 that is configured to rotate about an axis 46 that is radially offset from the axis 32 about which the input shaft 14 rotates. The measuring arrangement 24 also includes a single limit switch 30. In the exemplary embodiment illustrated in FIG. 3, the indicator 28 is operable to pivot approximately 360 degrees, and an angle of 360 degrees minus β is sufficient to move the indicator 28 from a first detected end position of the indicator 28 to a second detected end position of the indicator 28. The first and second detected end positions of the indicator 28 correspond with the retracted and extended conditions of the driven element 22 of the spindle drive 18, respectively, that define a full stroke of the spindle drive 18.

Referring now to FIG. 4, an exemplary embodiment of the measuring arrangement 24 of the motorized system 10 is illustrated. In the illustrated embodiment, the measuring arrangement 24 includes a first limit switch 30A and a second limit switch 30B that is circumferentially offset from the first limit switch 30A. The exemplary embodiment of the measuring arrangement 24 also includes a first indicator 28A and a second indicator 28B. The portions of the first and second indicators 28A, 28B that are detected by the first and second limit switches 30A, 30B, respectively, are circumferentially offset from each other by angle γ. The first and second indicators 28A, 28B are configured to rotate at a common rate of rotation from a first position, wherein the first indicator 28A is detected by the first limit switch 30A, to a second position, wherein the second indicator 28B is detected by the second limit switch 30B. As such, the first and second indicators 28A, 28B are operable to rotate 360 degrees minus γ from the first position to the second position to measure a full stroke of the spindle drive 18. In the embodiment illustrated in FIG. 4, the second indicator 28B is operable to be adjusted relative to the first indicator 28A, such that the angle γ is adjustable, as represented by Δγ. As such, the linear distance that the driven element 22 of the spindle drive 18 travels from the retracted condition to the extended condition (i.e., a full stroke of the spindle drive 18) may be adjustable via adjustment of the circumferential position of the second indicator 28B relative to the second indicator 28B.

It is contemplated that the measuring arrangement 24 of the motorized system 10 may include one or more intermediate limit switches 30 that are operable to interact with the at least one indicator 28 to measure the position of the spindle drive 18 when the driven element 22 of the spindle drive 18 is between the retracted condition and the extended condition.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS 10 motorized system
12 motor
14 input shaft
16 first gear system
18 spindle drive
20 driving element
22 driven element
24 measuring arrangement
26 second gear system
28 indicator
28A first indicator
28B second indicator
30 limit switch
30A first limit switch
30B second limit switch
32 axis
34 first axial end
36 second axial end
38 reduction gear
40 spindle
42 nut
44 clutch
46 axis

What is claimed is:

1. A motorized system, comprising:
a motor that drives rotation of an input shaft;
a first gear system operably coupled with the input shaft;
a spindle drive having a driving element that is operably coupled with the first gear system, such that rotation of the input shaft is operable to prompt rotation of the driving element via the first gear system, and a driven element that is engaged with the driving element, such that rotation of the driving element drives axial movement of the driven element; and
a measuring arrangement, comprising:
a second gear system operably coupled with the input shaft;
an indicator operably coupled with the second gear system, such that rotation of the input shaft is operable to prompt rotation of the indicator via the second gear system; and
at least one limit switch with which the indicator interacts to control operation of the motor, wherein the second gear system comprises a reduction gear, and the reduction gear has a reduction ratio such that rotating the input shaft to effect a full stroke of the spindle drive from a retracted condition to an extended condition causes the indicator to rotate less than 360 degrees.

2. The motorized system of claim 1, wherein the at least one limit switch comprises:
a single limit switch that is triggered by the indicator in the extended condition of the spindle drive and triggered by the indicator in the retracted condition of the spindle drive.

3. The motorized system of claim 1, wherein the at least one limit switch comprises:
a first limit switch that is triggered by the indicator in the extended condition of the spindle drive; and
a second limit switch that is triggered by the indicator in the retracted condition of the spindle drive.

4. The motorized system of claim 1, wherein the indicator and the input shaft are configured to rotate about a common axis of rotation.

5. The motorized system of claim 1, wherein the first and second gear systems are operably coupled with the input shaft on opposite axial ends of the motor.

6. The motorized system of claim 1, wherein the first gear system comprises a reduction gear.

7. The motorized system of claim 6, wherein the reduction ratio of the second gear system is higher than the reduction ratio of the first gear system.

8. The motorized system of claim 1, wherein the indicator is a first indicator and the measuring arrangement further comprises:

a second indicator configured to interact with the at least one limit switch.

9. The motorized system of claim 8, wherein the angular position of at least one of the first and second indicators is adjustable to allow for modification of the interaction between the at least one limit switch and the first and second indicators.

10. A motorized system, comprising:

a motor that drives rotation of an input shaft;

a first gear system operably coupled with the input shaft on a first axial end of the motor;

a spindle drive having a driving element that is operably coupled with the first gear system, such that rotation of the input shaft is operable to prompt rotation of the driving element via the first gear system, and a driven element that is engaged with the driving element, such that rotation of the driving element drives axial movement of the driven element; and a measuring arrangement, comprising:

a second gear system operably coupled with the input shaft on a second axial end of the motor that is opposite the first axial end;

an indicator operably coupled with the second gear system, such that rotation of the input shaft is operable to prompt rotation of the indicator via the second gear system; and at least one limit switch with which the indicator interacts to control operation of the motor, wherein the gear ratio of the first gear system relative to the gear ratio of the second gear system is such that rotation of the input shaft that results in a full stroke movement of the driven element of the spindle drive results in less than 360 degrees of rotation of the indicator.

\* \* \* \* \*